United States Patent [19]
Kaufman et al.

[11] 3,781,854
[45] Dec. 25, 1973

[54] AUTO ALARM ARMING SYSTEM

[75] Inventors: Peter Kaufman, Santa Barbara; F. Thomas Colsen, Goleta; Robert L. Townsend, Montecito, all of Calif.

[73] Assignee: Educated Vehicle Systems, Inc., Santa Barbara City, Calif.

[22] Filed: Feb. 14, 1972

[21] Appl. No.: 225,792

[52] U.S. Cl............................. 340/64, 307/10 AT
[51] Int. Cl............................................. B60r 25/10
[58] Field of Search....................... 340/63, 64, 65; 200/42; 307/10 AT

[56] References Cited
UNITED STATES PATENTS

| | | | |
|---|---|---|---|
| 3,541,505 | 11/1970 | Lee | 340/64 |
| 2,839,736 | 6/1958 | Tinsley et al. | 340/63 |
| 2,782,396 | 2/1957 | Marsh et al. | 340/63 |
| 3,281,785 | 10/1966 | Oursler | 340/63 |
| 1,747,194 | 2/1930 | Thomas | 340/65 |
| 3,310,775 | 3/1967 | Birth | 340/63 |

Primary Examiner—Alvin H. Waring
Attorney—Finkelstein & Mueth

[57] ABSTRACT

An alarm system comprises an armable circuit, an arming circuit adapted to pulse said armable circuit into its armed or "on" position and including a timer to activate said arming circuit after the passage of a fixed time period, a timer initiator for starting the timer into its timing mode, reset means to return and hold said timer in its initial or zero position only within said fixed time period to allow for a fixed or limited time for the reopening of doors and/or trunk without setting off the alarm, said armable circuit when in the armed mode being triggered by at least one automotive courtesy or dome light switch, hood switch, trunk switch and/or pressure sensitive seat belt interlock switch to complete the circuit allowing current to flow through said circuit to the automotive lights, horn, or other audible alarm device, a disarming circuit closed by the use of the door/ignition key to cause a momentary current to pulse said armable circuit into the disarmed mode.

9 Claims, 1 Drawing Figure

PATENTED DEC 25 1973
3,781,854
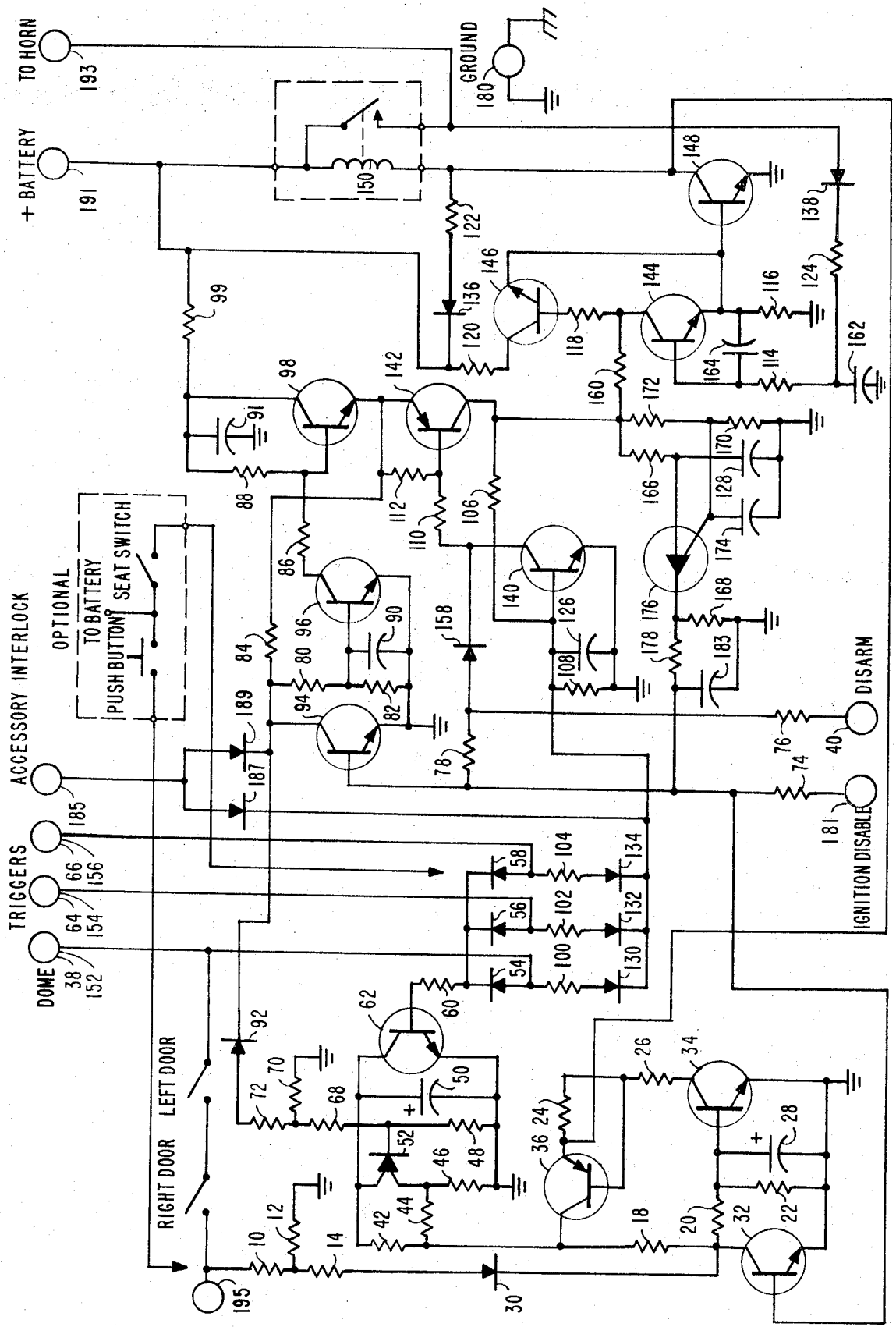

AUTO ALARM ARMING SYSTEM

BACKGROUND OF THE INVENTION

Numerous automotive alarm systems have been proposed. Most of them involve substantial modification of one or more existing automotive subassemblies, requiring additional tooling for production and final assembly. Further, the presence of many alarm systems on an automobile is immediately obvious. Since no system is completely foolproof, a readily detectable system is less desirable then one which is not conspicuous. Other alarm systems are unsightly or incovenient for the automobile owner to use.

More recently, an automotive security system which is totally controlled by the ignition/door key has been developed. This system is the subject of U.S. Pat. Application Ser. No. 118,456, filed Feb. 24, 1971, (now abandoned) the disclosure of which is expressly incorporated herein by reference. This system is armed by locking and disarmed by unlocking the driver's door with the key. The interior door lock button has no effect on the alarm. When the alarm is armed, any access gained to the car which activates the courtesy or dome light circuit and/or hood or trunk switches will sound the horn and/or blink the lights intermittently for a predetermined length of time and then shutdown automatically. The alarm, once activated, can be shut off by activating the ignition with the key for a brief period. Any attempt to cut the wires leading from the door to the cowl area will not affect the alarm once it is activated. If the opened door or deck lid, which set off the system, is not closed, the alarm will continue to sound indefinitely. Two of the primary advantages of the system are its ease of use and integral design which, because of packaging, is not physically discernible to a would-be intruder. The components are easily installed with no appreciable change to existing hardware or packaging on most models. The tumbler switch is self-adjusting and may be bench assembled to the door lock tumbler for loading into the door through the door lock tumbler hole.

Applicants' copending application Ser. No. 144,810 (now U.S. Pat. No. 3,710,317) is concerned with the use of the door/ignition key to arm and disarm an automotive security system. The system of that patent application is not activated when the door lock buttons are used to lock the doors. It is necessary to lock one door with the key to arm the system. The present invention involves a new and different solution to the problem of arming alarm systems as will more fully hereinafter appear.

SUMMARY OF THE INVENTION

Briefly, the present invention comprises an alarm system comprising: an armable circuit, an arming circuit adapted to pulse said armable circuit into its armed or "on" position and including a timer to activate said arming circuit after the passage of a fixed time period, a timer initiator for starting the timer into its timing mode, reset means to return and hold said timer in its initial or zero position only within said fixed time period to allow for a fixed or limited time for the reopening of doors and/or trunk without setting off the alarm, said armable circuit when in the armed mode being triggered by at least one automotive courtesy or dome light switch, hood switch, trunk switch and/or pressure sensitive seat belt interlock switch to complete the circuit allowing current to flow through said circuit to the automotive lights, horn, or other audible alarm device, a disarming circuit closed by the use of the door/ignition key to cause a monentary current to pulse said armable circuit into the disarmed mode.

This invention further includes an alarm system comprising: an electrical circuit for powering automotive lights, horn, and/or audible alarm device means operated by the tape deck and other accessory to automatically and continuously protect the same by holding the circuit in the open position, said circuit being closed by the removal of the tape deck or other accessory from its installed position within the vehicle, and deactivated and/or inhibited when the ignition switch for the accessory is in the "on" position to permit normal authorized removal of said accessory from the installed position.

In general, it is an object of our invention to provide a novel automotive alarm system which is fully compatible with existing automotive tooling and assembly procedures, is not readily detectable, and is uniquely simple for the automotive owner to use.

More particularly, the main object of this invention is the provision of an automobile security alarm system which can be armed by a door lock actuator lever or button, a button on the dashboard, or by turning the ignition to the accessory position and when triggered, can be shut down solely by the operation of the ignition switch.

These and other objects and advantages of the present invention will be apparent from the following detailed description and the accompanying drawings.

DESCRIPTION OF THE PREFERRED EMBODIMENTS

The system of this invention automatically arms when the door lock buttons are depressed and no operator is within the car. The system disarms by unlocking the door with the key in the normal manner. The system is not limited or dependant on any particular door or order of operation. The system has as a significant aspect the use of the ignition which when turned on with the key, makes it impossible to arm the system. Thus, it is not possible to accidentally cause the alarm to go off while the vehicle is being operated with the key. Further, the ignition key is used to disarm the system, and to deactivate the system after the alarm has been set off.

The system is provided with an automatic recycling open circuit sensing, time arm device, which allows the secured areas of the vehicle to be reopened within a given time period prior to actual arming, while automatically resetting and holding the time function to zero, and does not resume timing until the open area is again secured. The system uses the courtesy lights in conjunction with a door lock button circuit as a method of establishing whether a door is being locked by a riding passenger or driver, or one exiting the vehicle.

In one embodiment, an electrical seat switch is located in the frame of the seat cushion to sense the presence of a passgener or driver in order to hold off the arming mode of an alarm system. The seat switch can act as a trigger to the alarm circuit once the system is armed.

A stereo tape, radio or accessory protection switch and circuit can also be used to trigger the alarm system (irrespective of the system being armed) if the items so protected are removed without the ignition key being in the "on or accessory" position.

The system also allows the vehicle to be locked without arming the security device by using the door key to lock the door or other key locked opening. Schmidt triggers, or other flashing devices, can be employed to individually flash or sound the horns whereby conventional automotive horns provide a random asynchronous variation in pitch and loudness, which cannot be reproduced from within the car using the horn button.

The drawing is a schematic diagram of the preferred embodiment of the electrical system.

Turning to the drawing in greater detail:

The trigger initiator consists of resistors 10, 12, 14, 18, 20, 22, 24, 26, capacitor 28, diode 30 and transistors 32, 34 and 36. When pin 38 has power applied during a door open condition, and door locking switches right and left are in the lock position, current flows to ground through resistor divider 10 and 12 establishing a voltage between resistors 10 and 12. This voltage level permits current to flow through 14 and 30. In the initialized state transistor 32, 34, 36 are off so therefore the current from 30 flows through resistors 20 and 22 to ground. Capacitor 28 is used for filtering. The voltage established between resistors 20 adn 22 turns on transistor 34 and current flows from battery voltage through resistors 24 and 26 and transistor 34 to ground. The voltage established between resistors 24 and 26 turns on transistor 36 and current flows through resistors 18, 20 and 22 to ground maintaining the voltage between resistors 20 and 22 keeping transistor 34 on. Power may now be obtained from the collector of transistor 36 to initiate the Arming Delay Timer. To turn off the trigger initiator, battery power is applied to the disarm input pin 40. Current flows through resistors 76 and 78 into the base of transistor 32 to ground through the emitter of transistor 32. This current turns on transistor 32 and the current into resistor 20 now flows through transistor 32 to ground. With the current through resistor 20 removed transistor 34 turns off which turns off transistor 36 and the circuit is disarmed.

Delay Arming Timer

The delay arming timer comprises resistors 42, 44, 46, and 48, capacitor 50 and transistor 52. Resistors 44 and 46 set the trigger voltage of transistor 52. When capacitor 50 charges to the trigger point from a current determined by resistor 42 the programmable unijunction transistor triggers discharging capacitor 50 into resistor 48 creating a positive pulse with respect to ground. This pulse is applied to the arm circuit of the anit-theft device.

Timer Reset

The timer reset comprises diodes 54, 56, and 58, resistor 60 and transistor 62. When any input is present, which is a positive voltage, current flows through one or more of the diodes and through resistor 48 into the base of transistor 62 turning transistor 62 on. Transistor 62 shunts capacitor 50 to ground discharging it and holding it at ground. When the signal or signals are removed from pins 38, 64, or 66, transistor 62 turns off and capacitor 50 begins charging again.

Arm-Disarm

The arm-disarm circuit comprises resistors 68, 70, 72, 74, 76, 78, 80, 82, 84, 86 and 88, capacitors 90, 91 diode 92 and transistors 94, 96, and 98. The positive pulse from the Delay Arming Timer causes current to flow to ground through resistor divider resistors 68 and 70 establishing a voltage between resistors 68 and 70. This voltage level permits current to flow through resistor 72 and diode 92. In the disarmed state transistors 94, 96 and 98 are off and current from diode 92 flows through resistors 80 and 82 to ground. Capacitors 90 and 91 are used for filtering. The voltage established between resistor 80 and resistor 82 turns on transistor 96 and current flows from battery voltage through resistors 86 and 88 and transistor 96 to ground. The voltage established between resistors 86 and 88 turns on transistor 98 and current flows through resistors 84, 80 and 82 to ground maintaining the voltage between resistors 80 and 82 keeping transistor 96 on. Power may now be obtained from the collector of transistor 98 through load resistor 99 to power the horn-activated circuit. To disarm the arm-disarm circuit battery power is applied to the disarm input pin 40. Current flows through resistors 76 and 78 into the base of transistor 94 and to ground through the emitter of transistor 94. This current turns on transistor 94 and the current into resistor 80 now flows into the collector of transistor 94 to ground. With the current through resistor 80 removed, transistor 96 turns off which turns off transister 98 and the circuit is disarmed.

Horn-Activate Circuit

The horn-activate circuit consists of resistors 100, 102, 104, 106, 108, 110, 112, 114, 116, 118, 120, 122 and 124, capacitors 126 and 128, diodes 130, 132, 134, 136 and 138, transistors 140, 142, 144, 146 and 148 and relay 150. With the arm disarm circuit in the arm state power is available at the collector of transistor 98. When trigger 152, 154 or 156 are applied current flows through resistors 100 and 102, diode 132 or resistor 104, diode 134 into the base of transistor 140 turning on transistor 140. When transistor 140 turns on current flows from the collctor of transistor 98 through resistors 110 and 112 through transistor 140 to ground. With transistor 140 on diode 158 and transistor 140 pass the current from the disarm preventing it from entering the base of transistor 94 and turning the entire system off. The voltage established between resistors 110 and 112 turns on transistor 142 and current flows through resistors 106 and 108 maintaining transistor 140 in the "on" state. Current is provided to the time out circuit and through resistor 160 to activate the horn. The current through resistor 160 flows through resistor 118 to the base of transistor 146 which is connected in a darlington pair configuration with transistor 148. The transistors 146 and 148 darlington pair turns on energizing relay 150 which powers the horn or lights. Horn power creates a current through diode 136 and resistor 124 charging capacitor 162 when the voltage on capacitor 162 is high enough the current through resistor 114 turns on transistor 144 removing the current through resistor 118. This turns the horn off until capacitor 162 discharges, turning transistor 144 off and the horn on. Horn cycle rate is one cycle per second. Transistors 144, 146 and 148 form a Schmidt Trigger circuit. Capacitor 164 is a filter capacitor and resistor 122, diode 136 are a spike filter for the relay 150 as it is switched by transistor 148.

Time-Out Circuit

The time-out circuit comprises resistors 166, 168, 170 and 172, capacitors 128 and 174 and transistor 176. Power is provided from the collector of transistor 142 when the circuit is activated. Resistors 108 and 172 set the trigger voltage of transistor 176, a programmable unijunction transistor. When capacitor 128 charges to the trigger voltage from a current determined by resistor 166, capacitor 176 triggers discharging capacitor 128 through resistor 168 creating a positive pulse with respect to ground. This pulse is used for shut down of the anit-theft device.

Shut down and Ignition Disable

The shutdown pulse from the time-out circuit creates a current through resistor 178 turning on transistors 32 and 94 turning off both the trigger initializer and the arm circuit. The ignition disable placing battery voltage on pin 181 creates a current in resistor 74 turning on transistors 32 and 94 turning off both the trigger initializer and the arm circuit. Capacitor 183 is a filtering capacitor.

Pin 185 is the input from stereotape, radio and accessory protection. Diodes 187 and 189 steer power for direct activation of the system. Pin 191 provides the battery voltage for the system. Pin 193 provides output for the horn. Pin 195 is the input for the door lock buttons or dash-mounted switch in conjunction with the seat switch, whichever is used.

Another configuration of the anti-theft system requiring zero power in both the unarmed and armed state can be obtained through use of three single pole double throw dual coil magnetic latching relays. The first device is used for the trigger initiator where coil one is used to initiate, and coil two disarms. The contacts close on initialization to supply power to the delay-arming timer.

The second device is used in the arm-disarm circuit with coil one used to arm and coil two to disarm. The contacts connect the trigger circuits to the third device so if a trigger occurs coil one is energized and the contacts apply power to the horn circuit. When time out occurs coil two is pulsed turning off the horn activate circuit.

The power to pin 38 can also be applied momentarily from either the dash-mounted switch or turning the key to accessory, in lieu of the use of the door-lock button or latch. If someone is sitting on the seat the seat belt interlock switch prevents the system from activating. Once the seat switch is opened the system times out and arms. Then the seat switch assumes the function of an additional trigger to the system.

Likewise, many variations of the transistorized circuitry of this invention will be apparent to those skilled in the art which will provide the unique operation and results of the system. In addition, the circuitry can be in the form of an integrated circuit or an electro-mechanical system.

Having fully described the invention it is intended that it be limited only by the lawful scope of the appended claims.

We claim:

1. An automotive alarm system comprising: an armable circuit, an arming circuit adapted to cause a non-continuous current to pulse said armable circuit and cause said armable circuit to go into its armed mode, said armable circuit when in the armed mode being triggered by a sensing means to complete the circuit allowing current to flow to the automotive lights, horn, or other alarm device, and a disarming circuit which when closed causes a non-continuous current to pulse said armable circuit into the disarmed or deactivated mode.

2. An alarm system comprising:
an armable circuit,
an arming circuit adapted to cause a non-continuous current to pulse said armable circuit and cause said armable circuit to go into its armed or "on" position and including a timer to activate said arming circuit after the passage of a fixed time period,
a timer initiator for starting the timer into its timing mode,
reset means to return and hold said timer in its initial or zero position only within said fixed time period to allow for a fixed or limited time for the reopening of doors and/or trunk without setting off the alarm,
said armable circuit when in the armed mode being triggered by a sensing means to complete the circuit allowing current to flow to the automotive lights, horn, or other alarm device.

3. An alarm system comprising:
an armable circuit,
an arming circuit adapted to cause a non-continuous current to pulse said armable circuit and cause said armable circuit to go into its armed or "on" position and including a timer to activate said arming circuit after the passage of a fixed time period,
a timer initiator for starting the timer into its timing mode,
reset means to return and hold said timer in its initial or zero position only within said fixed time period to allow for a fixed or limited time for the reopening of doors and/or trunk without setting off the alarm,
said armable circuit when in the armed mode being triggered by a sensing means to complete the circuit allowing current to flow to the automotive lights, horn, or other alarm device,
a disarming circuit closed by the use of the door/ignition key to cause a non-continuous current to pulse said armable circuit into the disarmed or deactivated mode.

4. The device of claim 1 wherein the armable circuit is made to send a pulse by a door lock actuator and the timer initiator is responsive to the sequence:
open door,
door lock actuator being in the locked position, and
closed door, said sequence indicating the exiting and locking of the vehicle from the outside.

5. The device of claim 1 wherein the armable circuit is made to send a pulse by a door lock actuator and the timer initiator is responsive to the sequence;
courtesy dome light door switch being "on,"
both right and left door lock actuators being in the locked position; and
courtesy dome light door switch being turned "off" by the closing of the last of said doors whereby the system recognizes and arms when the door lock buttons are depressed and the operator is exiting the vehicle.

6. The device of claim 1 wherein the armable circuit is made to send a pulse by a door lock actuator and the timer initiator is responsive to the sequence:

right and left door lock actuators being in the locked position, pressure sensitive seat belt interlock switch recognizing the absence of a passenger or operator whereby the system recognizes and arms when the door lock buttons are depressed and the operator is exiting the vehicle.

7. An alarm system comprising:

an electrical circuit for powering automotive lights, horn, or other alarm device, means operated by the tape deck, spare tire, secured but removable object, or other accessory to automatically and continuously protect the same by holding the circuit in the open position, said circuit being closed by the removal of the tape deck, spare tire, secured but removable object, or other accessory from its installed position within the vehicle, and a door, ignition, or any key operated switch, wherein said switch must be in the "on" position to be deactivated and/or inhibit said circuit and permit normal authorized removal of said accessory from the installed position.

8. The system of claim 1 wherein the armable circuit includes a single pole, double-throw magnetic latching relay having two coils and requiring no power in the open or closed position.

9. The device of claim 2 wherein the timer initiator is responsive to the operation of a switch located within the vehicle which is operative to begin the time sequence.

* * * * *